(12) United States Patent
Van Camp

(10) Patent No.: US 10,007,261 B2
(45) Date of Patent: Jun. 26, 2018

(54) METHODS AND APPARATUS TO FILTER PROCESS CONTROL SYSTEM ALARMS BASED ON ALARM SOURCE TYPE AND/OR ALARM PURPOSE

(71) Applicant: Fisher-Rosemount Systems, Inc., Round Rock, TX (US)

(72) Inventor: Kim Ordean Van Camp, Georgetown, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 702 days.

(21) Appl. No.: 14/505,755

(22) Filed: Oct. 3, 2014

(65) Prior Publication Data
US 2016/0098018 A1   Apr. 7, 2016

(51) Int. Cl.
   *G05B 23/02*   (2006.01)
(52) U.S. Cl.
   CPC .................. *G05B 23/0272* (2013.01)
(58) Field of Classification Search
   CPC .................................................. G05B 23/0272
   USPC .......................................................... 700/80
   See application file for complete search history.

(56) References Cited

U.S. PATENT DOCUMENTS

| | | | |
|---|---|---|---|
| 6,535,122 B1 * | 3/2003 | Bristol ............... | G05B 23/0272 340/506 |
| 6,690,274 B1 * | 2/2004 | Bristol ............... | G05B 23/0267 340/506 |
| 7,725,570 B1 * | 5/2010 | Lewis .................... | G06Q 10/04 709/223 |

OTHER PUBLICATIONS

Hogg et al., "Development of a situation awareness measure to evaluate advanced alarm systems in nuclear power plant control rooms", 1995, 20pg.*
Intellectual Property Office of the United Kingdom, "Examination Report," issued in connection with Patent Application No. GB1517036.8, dated Feb. 26, 2018, 6 pages.

* cited by examiner

*Primary Examiner* — Ryan D. Coyer
(74) *Attorney, Agent, or Firm* — Hanley, Flight & Zimmerman, LLC

(57) ABSTRACT

Methods, apparatus, systems and articles of manufacture to filter process control system alarms based on alarm source type and/or alarm purpose are disclosed. An example method includes assigning a first subset of the process control alarms in a process control system to a first source type of the process control alarms. The first source type is associated with a first subset of user roles. The example method also includes assigning a second subset of the process control alarms to a second source type of the process control alarms. The second source type is associated with a second subset of the user roles. The example method further includes displaying alarm information associated with the process control alarms. The alarm information identifies the first source type of the first subset of the process control alarms and the second source type of the second subset of the process control alarms.

20 Claims, 8 Drawing Sheets

| User Roles | Associated Alarm Source Type(s) | Associated Alarm Purpose(s) |
|---|---|---|
| Continuous Control Room Operator | Process Conditions | |
| Control System Engineer | Process Conditions, Control System Equipment | |
| Electrical Engineer | Electrical Equipment | |
| Electrical and Instrumentation Lead | Control System Equipment | |
| Instrumentation Technician | Instrumentation Equipment | |
| Lead Continuous Control Room Operator | Process Conditions | |
| Oil Analyst | Rotating Equipment | |
| Online Machinery Engineer | Electrical Equipment, Rotating Equipment | Safety, Environmental Protection |
| Plant Manager | | |
| Process Engineer | Process Conditions | |
| Production Manager | | Product Quality, Process Efficiency |
| Production Planner | | Process Efficiency |
| Quality Control Engineer | | Product Quality |
| Reliability Manager | Process Hardware | |
| Rotating Equipment Reliability Engineer | Rotating Equipment | |
| Safety Engineer | | Safety |
| Shift Supervisor | | Process Efficiency, Product Quality |
| Thermographer | Rotating Equipment | |
| Vibration Analyst | Rotating Equipment | |
| ... | ... | ... |

FIG. 5

METHODS AND APPARATUS TO FILTER PROCESS CONTROL SYSTEM ALARMS BASED ON ALARM SOURCE TYPE AND/OR ALARM PURPOSE

FIELD OF THE DISCLOSURE

This disclosure relates generally to process control systems and, more particularly, to methods and apparatus to filter process control system alarms based on alarm source type and/or alarm purpose.

BACKGROUND

Process control systems, like those used in chemical, petroleum or other processes, typically include one or more process controllers communicatively coupled to one or more field devices via analog, digital or combined analog/digital buses. The field devices, which may be, for example, valves, valve positioners, switches and transmitters (e.g., temperature, pressure and flow rate sensors), perform process control functions within the process such as opening or closing valves and measuring process control parameters. The process controllers receive signals indicative of process measurements made by the field devices and then process this information to generate control signals to implement control routines, to make other process control decisions, and to initiate process control system alarms. Frequently, process control information may also be recorded for long-term historization for subsequent analysis and/or training.

Information from the field devices and/or the controller is usually made available over a data highway or communication network to one or more other hardware devices such as operator workstations, personal computers, data historians, report generators, centralized databases, etc. Such devices are typically located in control rooms and/or other locations remotely situated relative to the harsher plant environment. These hardware devices, for example, run applications that enable an operator to perform any of a variety of functions with respect to a process control system, such as viewing the current state of the process, changing an operating state, changing settings of a process control routine, modifying the operation of the process controllers and/or the field devices, viewing alarms generated by field devices and/or process controllers, simulating the operation of the process for the purpose of training personnel and/or evaluating the process, etc.

These hardware devices typically include one or more operator interface displays to display pertinent information regarding the operating state(s) of the control system(s) and/or the devices within the control system. Example displays take the form of alarm displays that receive and/or display alarms generated by controllers or devices within the process control system, control displays that indicate the operating state(s) of the controller(s) and other device(s) within the process control system, etc.

In a process control system it is common for thousands of alarms to be defined within the process control system to notify operators of the process control system of potential problems. Alarms are defined, for example, to protect people and/or equipment, to avoid environmental incidents, and/or to ensure product quality during production. Each alarm is typically defined by one or more settings (e.g., an alarm limit) that define when a problem has occurred or may be imminent and/or trigger the alarm, and a priority (e.g., critical or warning) to define the importance of the alarm relative to other alarms.

SUMMARY

Methods, apparatus, systems and articles of manufacture to filter process control system alarms based on alarm source type and/or alarm purpose are disclosed. In one example, a method includes assigning a first subset of the process control alarms in a process control system to a first source type of the process control alarms. The first source type is associated with a first subset of user roles. The example method also includes assigning a second subset of the process control alarms to a second source type of the process control alarms. The second source type is associated with a second subset of the user roles. The first subset of the process control alarms is different than the second subset of the process control alarms. The first subset of the user roles is different than the second subset of the user roles. The example method further includes displaying alarm information associated with the process control alarms. The alarm information identifies the first source type of the first subset of the process control alarms and the second source type of the second subset of the process control alarms.

In another example, an apparatus include an alarm categorizer to assign a first subset of the process control alarms in a process control system to a first source type of the process control alarms. The first source type is associated with a first subset of user roles. The alarm categorizer is also to assign a second subset of the process control alarms to a second source type of the process control alarms. The second source type is associated with a second subset of the user roles. The first subset of the process control alarms is different than the second subset of the process control alarms. The first subset of the user roles is different than the second subset of the user roles. The example apparatus also includes a display to display alarm information associated with the process control alarms. The alarm information identifies the first source type of the first subset of the process control alarms and the second source type of the second subset of the process control alarms.

BRIEF DESCRIPTION OF THE DRAWINGS

FIG. 5 illustrates an example user role data structure associated with the example user role database of FIG. 2.

DETAILED DESCRIPTION

Figure 1:
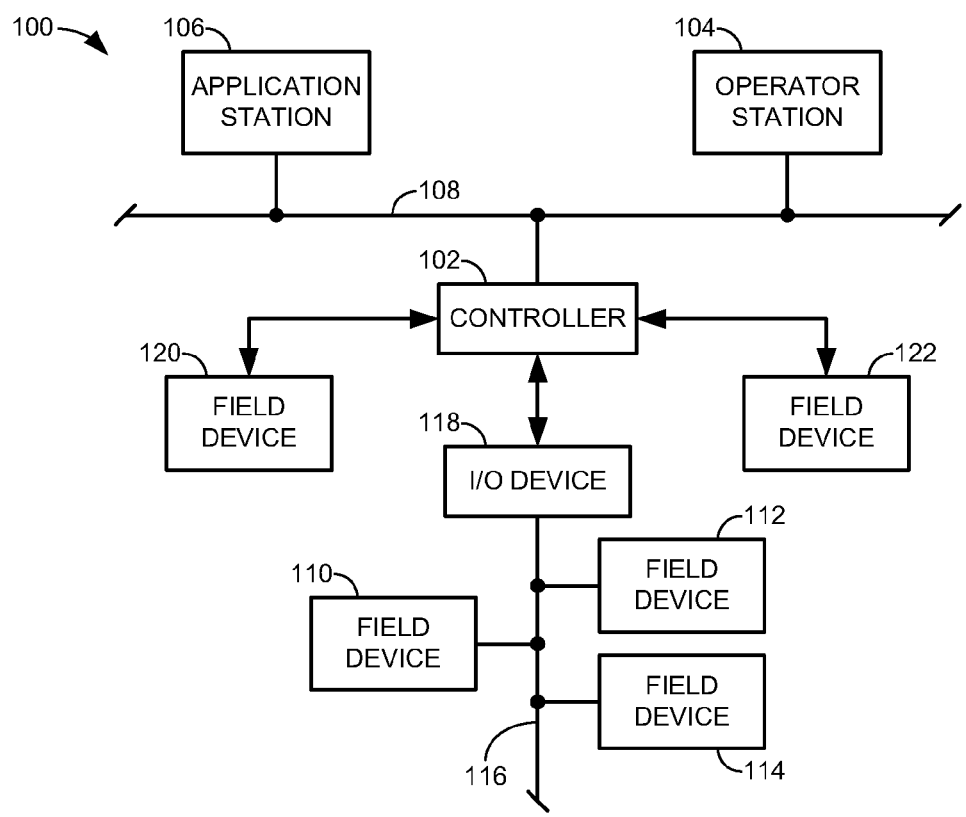
FIG. 1 is a schematic illustration of an example process control system.

Alarm displays are one of the primary means by which process control system operators remain aware of potential problems and/or abnormalities in a process control system. A typical alarm display includes a tabulated list of active alarms. In such a tabular format, each alarm is presented as a single line in the alarm list with specific data that may be relevant to inform an operator of the state of the control system. Information provided in an alarm display may include for example, a description of the alarm, a name or tag for the process variable that triggered the alarm, a measurement value for the process variable associated with the alarm, a threshold setting or alarm limit (e.g., the value for the process variable at which the alarm is triggered), a time of alarm activation, a source or location of the alarm (e.g., the area, unit, module associated with the alarm), an alarm priority and/or criticality, an alarm state (e.g., acknowledged or not, active or not), an alarm type (e.g., high, low, etc.). Often, alarm displays are updated in substantially real time as information is received from process controllers and/or field devices to allow the operators access to current information regarding all active alarms. In some circumstances, alarms may provide instructions for verifying and/or correcting the abnormal conditions indicated by the alarms to facilitate the appropriate response to the alarms by an operator.

There are many different types of personnel with a variety of different roles associated with the operation of a processing plant or other process control system. Among the many different personnel, alarms are typically generated and/or directed to individuals filling the roles of control room operator and/or maintenance technician. However, in many instances, there are other individuals similarly interested in having access to alarm data. Because such individuals do not have the same responsibilities and/or roles as operators and/or technicians to oversee and/or respond to process control alarms, the alarms of interest to other individuals may be limited to a particular subset of all alarms. For example, certain individuals may have specialized skills and/or expertise to assist the operators and/or technicians in responding to only those alarms associated with their particular expertise (e.g., a rotating equipment specialist to address an alarm associated with the performance of a pump). Other individuals may have duties to perform that are ancillary to the daily operation of a process control system for which only certain alarms may be relevant (e.g., a safety, health, and environment (SHE) engineer may only desire alarm information indicative of safety and/or environmental risks and/or problems). For purposes of clarity, control system operators and maintenance technicians are referred to herein as primary alarm users. Other individuals that are interested in a specific subset of alarms depending on their roles and/or responsibilities are referred to herein as secondary alarm users.

While many secondary alarm users may be interested in and/or qualified to address certain subsets of alarms, the current taxonomies or classifications of alarms used in the industry cannot adequately identify these subsets of alarms to the exclusion of the other alarms not pertinent to the particular roles of the secondary alarm users. In particular, in many known process control systems, taxonomies for alarms serve to define the state of problems in a process control system including what is wrong, when and where the detected abnormalities occurred, and how serious or critical the problems are. Although such information is what primary alarm users need to fulfill their responsibilities, the information is insufficient to isolate the subset of alarms of interest to highly specialized secondary alarm users. As a result, the secondary alarm users typically must sift through all alarms to identify those relevant to their particular needs, roles, and/or responsibilities, thereby resulting in wasted time and expense.

The examples disclosed herein overcome these deficiencies of current process control systems by categorizing alarms based on novel taxonomies that facilitate the division of alarms into different groups or classes associated with the roles of different secondary alarm users. More particularly, in some examples, each alarm in a process control system is designated by or assigned to a source type corresponding to the type or general category of asset or source from which the alarm arose. That is, each alarm is categorized according to the nature (e.g., type) of the equipment or circumstance giving rise to the alarm. In some such examples, the different types of sources to which each alarm may be assigned include an instrumentation equipment source, a control system equipment source, a rotating equipment source, an electrical equipment source, a process hardware source, or a process conditions source. While some alarms could potentially be associated with more than one of the source types noted above, in some examples, the different source types are mutually exclusive and collectively exhaustive (e.g., each and every alarm is associated with one, and only one, source type). The different types of sources may be associated with different roles of personnel associated with a process control system that access alarm data (e.g., primary alarm users and/or secondary alarm users). For example, alarms assigned to the electrical equipment source type may be associated with electrical engineers such that active alarms having an electrical equipment source may be identified for the electrical engineers while other alarms that are irrelevant to electrical engineers are excluded.

Additionally or alternatively, in some examples, each alarm in a process control system is designated by or assigned to a particular functional class indicative of a purpose or reason of the alarm. That is, each alarm is categorized according to an overarching rationale (e.g., purpose) for which the alarm exists or was created. For example, some alarms are created to serve as a warning against potential health and/or safety hazards, while other alarms may be created with the purpose of improving (e.g., optimizing) the efficiency of the process control system. In other words, the functional classification of alarms described herein serves to indicate a general type of benefit, objective, and/or outcome to be achieved (or the corresponding consequence to be avoided) by responding to the alarm. In some such examples, the different alarm purposes to which each alarm may be assigned include an equipment protection purpose, an environment protection purpose, a product quality purpose, a process efficiency purpose, or a safety purpose. While some alarms could potentially serve more than one alarm purpose noted above, in some examples, the different alarm purposes are mutually exclusive and collectively exhaustive (e.g., each and every alarm is associated with one, and only one, purpose). The different alarm purposes may be associated with different roles of personnel associated with a process control system that access alarm data (e.g., primary alarm users and/or secondary alarm users). For example, alarms with a product quality purpose may be associated with quality control engineers such that active alarms having a product quality purpose may be identified for the quality control engineers while other alarms that are irrelevant to quality control engineers are excluded.

Using the alarm taxonomies described above, individuals having roles with specific duties and/or specialized skills or expertise (e.g., secondary alarm users) can more easily access relevant alarm information without having to sift through extraneous information not relevant to their particular needs, expertise, and/or specialization. As a result, the time (and, therefore, the cost) expended by such a secondary alarm user in obtaining the desired information may be substantially reduced. Furthermore, while secondary alarm users may access alarm information in real-time, often, they will review such information after it has been historically archived. By enabling filtering of such alarm data in accordance with the teachings described herein, the amount of memory and/or processing power used to retrieve the relevant information can be significantly reduced. Further still, by identifying relevant alarm data to the exclusion of irrelevant data as disclosed herein, there are lower bandwidth requirements to transmit the data to the particular individuals requesting such data.

FIG. 1 is a schematic illustration of an example process control system 100. The example process control system 100 of FIG. 1 includes one or more process controllers (one of which is designated at reference numeral 102), one or more operator stations (one of which is designated at reference numeral 104), and one or more workstations (one of which is designated at reference numeral 106). The example process controller 102, the example operator station 104 and the example workstation 106 are communicatively coupled via a bus and/or local area network (LAN) 108, which is commonly referred to as an application control network (ACN).

The example operator station 104 of FIG. 1 allows an operator, engineer, and/or other plant personnel to review and/or operate one or more operator display screens and/or applications that enable the user to view process control system variables, view process control system states, view process control system conditions, view process control system alarms, and/or change process control system settings (e.g., set points, operating states, clear alarms, silence alarms, etc.). An example manner of implementing the example operator station 104 of FIG. 1 is described below in connection with FIG. 2. Example data structures that may be used to implement the example operator station 104 are described below in connection with FIGS. 3-5.

The example operator station 104 includes and/or implements an alarm presentation interface to render an alarm display (e.g., the example alarm list 700 of FIG. 7) associated with active alarms in a process control system. Further, in the illustrated example, the operator station 104 includes and/or implements an alarm filter to filter process control alarms based on an identified role of a user accessing the alarm information shown in the alarm display. In some examples, the alarm filter filters the process control alarms according to the source type(s) and/or the functional class(es) assigned to each alarm that correspond to the identified role of the user. For example, if the user role is identified as corresponding to that of instrumentation technician, the alarm filter may filter out all alarms except those associated with an instrumentation equipment source type. That is, in such examples, the alarm display may be updated to display the process control alarms arising from instrumentation equipment but exclude all other process control alarms. In this manner, the user can quickly review all alarms relevant to the role of the user (an instrumentation technician in this example).

The example workstation 106 of FIG. 1 may be configured as an application station to perform one or more information technology applications, user-interactive applications and/or communication applications. For example, the application station 106 may be configured to perform primarily process control-related applications, while another application station (not shown) may be configured to perform primarily communication applications that enable the process control system 100 to communicate with other devices or systems using any desired communication media (e.g., wireless, hardwired, etc.) and protocols (e.g., HTTP, SOAP, etc.). The example operator station 104 and the example workstation 106 of FIG. 1 may be implemented using one or more workstations and/or any other suitable computer systems and/or processing systems. For example, the operator station 104 and/or workstation 106 could be implemented using single processor personal computers, single or multi-processor workstations, etc.

The example LAN 108 of FIG. 1 may be implemented using any desired communication medium and protocol. For example, the example LAN 108 may be based on a hard-wired and/or wireless Ethernet communication scheme. However, any other suitable communication medium(s) and/or protocol(s) could be used. Further, although a single LAN 108 is illustrated in FIG. 1, more than one LAN and/or other alternative pieces of communication hardware may be used to provide redundant communication paths between the example systems of FIG. 1.

The example controller 102 of FIG. 1 is coupled to a plurality of smart field devices 110, 112, 114 via a digital data bus 116 and an input/output (I/O) gateway 118. The smart field devices 110, 112, 114 may be Fieldbus compliant valves, actuators, sensors, etc., in which case the smart field devices 110, 112, 114 communicate via the digital data bus 116 using the well-known Foundation Fieldbus protocol. Of course, other types of smart field devices and communication protocols could be used instead. For example, the smart field devices 110, 112, 114 could instead be Profibus and/or HART compliant devices that communicate via the data bus 116 using the well-known Profibus and HART communication protocols. Additional I/O devices (similar and/or identical to the I/O gateway 118 may be coupled to the controller 102 to enable additional groups of smart field devices, which may be Foundation Fieldbus devices, HART devices, etc., to communicate with the controller 102.

In addition to the example smart field devices 110, 112, 114, one or more non-smart field devices 120, 122 may be communicatively coupled to the example controller 102. The example non-smart field devices 120, 122 of FIG. 1 may be, for example, conventional 4-20 milliamp (mA) or 0-24 volts direct current (VDC) devices that communicate with the controller 102 via respective hardwired links.

The example controller 102 of FIG. 1 may be, for example, a DeltaV™ controller sold by Fisher-Rosemount Systems, Inc., an Emerson Process Management company. However, any other controller could be used instead. Further, while only one controller 102 is shown in FIG. 1, additional controllers and/or process control platforms of any desired type and/or combination of types could be coupled to the LAN 108. In any case, the example controller 102 performs one or more process control routines associated with the process control system 100 that have been generated by a system engineer and/or other system operator using the operator station 104 and which have been downloaded to and/or instantiated in the controller 102.

While FIG. 1 illustrates an example process control system 100 within which the methods and apparatus to filter process control alarms based on user roles described in greater detail below may be advantageously employed, the methods and apparatus described herein may, if desired, be advantageously employed in other process plants and/or process control systems of greater or less complexity (e.g., having more than one controller, across more than one geographic location, etc.) than the illustrated example of FIG. 1.

Figure 2:
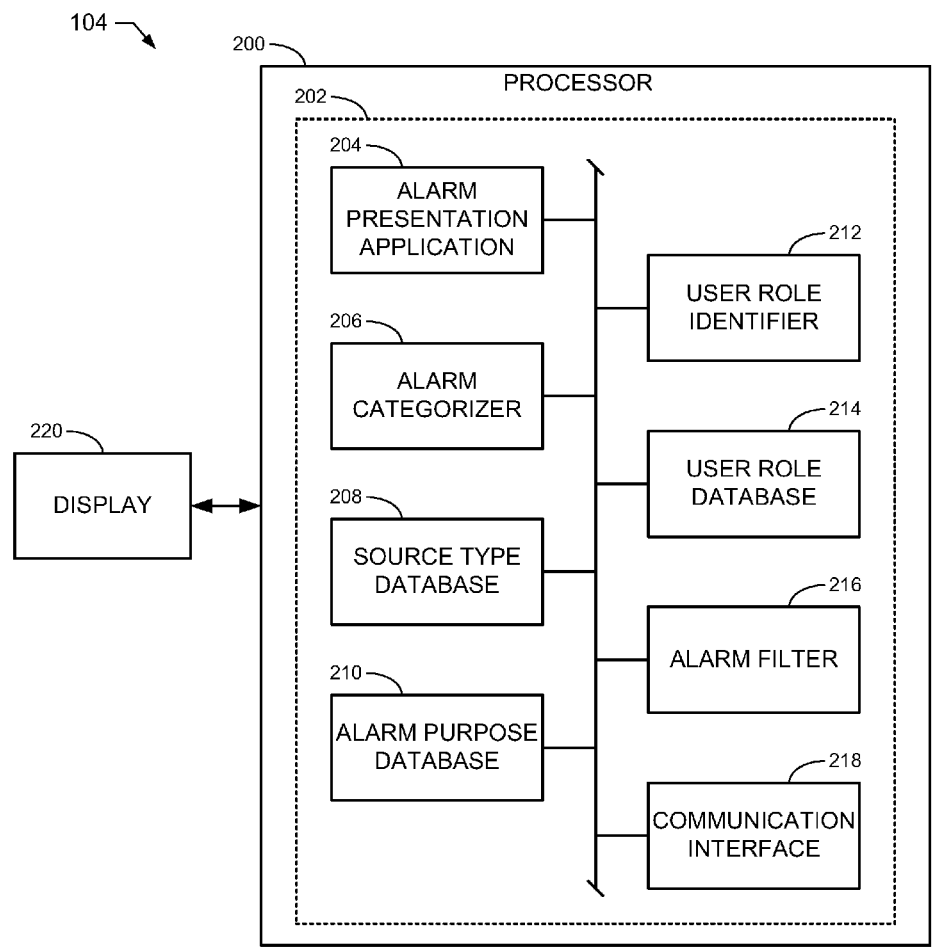
FIG. 2 illustrates an example manner of implementing the example operator station of FIG. 1.

FIG. 2 illustrates an example manner of implementing the example operator station 104 of FIG. 1. The example operator station 104 of FIG. 2 includes at least one programmable processor 200. The example processor 200 of FIG. 2 executes coded instructions stored in a main memory 202 of the processor 200 (e.g., within a random-access memory (RAM) and/or a read-only memory (ROM)). The processor 200 may be any type of processing unit, such as a processor core, a processor and/or a microcontroller. The processor 200 may implement or execute, among other things, an example alarm presentation application 204, an example alarm categorizer 206, an example source type database 208, an example alarm purpose database 210, an example user role identifier 212, an example user role database 214, an example alarm filter 216, and an example communication interface 218. The example main memory 202 of FIG. 2 may be implemented by and/or within the processor 200 and/or may be one or more memories and/or memory devices operatively coupled to the processor 200.

To allow a user to interact with the example processor 200, the example operator station 104 of FIG. 2 includes any type of display 220. Example displays 220 include, but are not limited to, a computer monitor, a computer screen, a television, a mobile device (e.g., a smart phone, a Blackberry™ and/or an iPhone™), etc. capable of displaying user interfaces and/or applications implemented by the processor 200 and/or, more generally, the example operator station 104.

The example alarm presentation application 204 of FIG. 2 generates and/or facilitates the rendering of an alarm display by and/or at the example display 220. In some examples, the alarm display generated by the alarm presentation application 204 includes alarm information corresponding to active alarms in the process control system. In some examples, the alarm information is based on alarm data collected via the example communication interface 218 from one or more process controllers (e.g., the example controller 102 of FIG. 1) and/or other elements of a process control system. In some examples, the alarm information includes an indication of the general asset category or source type of each of the alarms. In some examples, the alarm information includes an indication of the functional class or purpose of each of the alarms. In some examples, one or more of the alarms may be suppressed and/or excluded from display based on a filtering of the alarms with respect to the source type and/or the functional class of the alarm as described more fully below. An example alarm display is described below in connection with FIG. 7.

In the illustrated example of FIG. 2, the example operator station 104 is provided with the example alarm categorizer 206 to categorize process control alarms based on their source type and/or their purpose. In some examples, the source types and/or purposes to which the alarms are assigned correspond to default categories (e.g., source types and alarm purposes) preconfigured by a vendor and/or manufacturer. In some examples, the source types and/or purposes may be configured by an end user.

Figure 3:
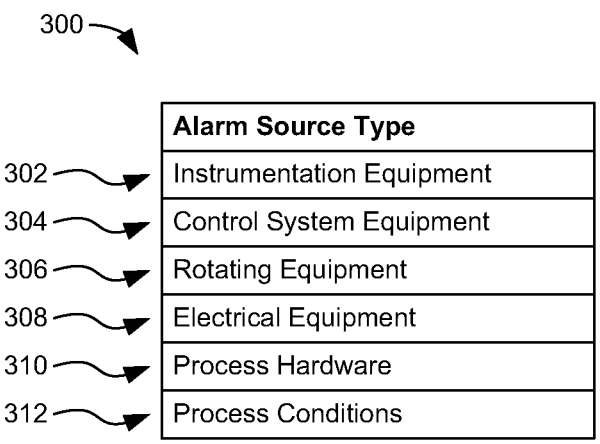
FIG. 3 illustrates an example source type data structure associated with the example source type database of FIG. 2.

In some examples, the different source types used to categorize the alarms are designated in a data structure stored in the source type database 208. An example source type data structure 300 is illustrated in FIG. 3. As shown in FIG. 3, the example source type data structure 300 includes six different types of alarm sources or source types 302, 304, 306, 308, 310, 312. In the illustrated example, the source types 302, 304, 306, 308, 310, 312 are mutually exclusive and collectively exhaustive. That is, in the illustrated example, each alarm in the process control system 100 is assigned to only one of the source types but every alarm in the process control system is assigned to one of the source types.

As used herein, the source type of an alarm refers to the nature of the equipment, asset, and/or circumstance giving rise to the alarm. In some examples, the source type of an alarm serves to group alarms according to general types or categories of assets for which individuals with particular roles and associated duties and/or specialized expertise may have an interest and/or are qualified to address and/or resolve. For example, the instrumentation equipment source type 302 corresponds to apparatus used to make process measurements and/or modify process conditions such as, for example, a temperature transmitter or a control valve. In the illustrated example, alarms arising from this source type (e.g., instrumentation equipment) indicate failure, performance degradation, and/or other abnormal conditions of such equipment. In some examples, individuals with specialized expertise in instrument calibration and/or understanding of device communication protocols (e.g., HART, Fieldbus, etc.) may be best qualified and/or specifically have a role to resolve the issues presented by such alarms. Accordingly, in some examples, such individuals and/or their associated roles are associated with the instrumentation equipment source type 302.

In the illustrated example of FIG. 3, the control system equipment source type 304 corresponds to the computers, controllers, input/output cards, their software and firmware, and/or other such elements used to receive data from and/or send signals to the instrumentation equipment. In the illustrated example, alarms arising from this source type (e.g., control system equipment) indicate failure, performance degradation, and/or other abnormal conditions of such equipment. In some examples, individuals with specialized expertise in programming control systems, updating system software, and/or diagnosing abnormal control actions may be best qualified and/or specifically have a role to resolve the issues presented by such alarms. Accordingly, in some examples, such individuals and/or their associated roles are associated with the control system equipment source type 304.

In the illustrated example of FIG. 3, the rotating equipment source type 306 corresponds to physical equipment that contains rotating parts such as, for example, a pump or a turbine. In the illustrated example, alarms arising from this source type (e.g., rotating equipment) indicate failure, performance degradation, and/or other abnormal conditions of such equipment. In some examples, individuals with specialized expertise in vibration analysis and/or lubricant analysis may be best qualified and/or specifically have a role to resolve the issues presented by such alarms. Accordingly, in some examples, such individuals and/or their associated roles are associated with the rotating equipment source type 306.

In the illustrated example of FIG. 3, the electrical equipment source type 308 corresponds to power generation and/or power distribution equipment. In the illustrated example, alarms arising from this source type (e.g., electrical equipment) indicate failure, performance degradation, and/or other abnormal conditions of such equipment. In some examples, individuals with specialized expertise in electrical equipment analysis and/or servicing may be best qualified and/or specifically have a role to resolve the issues presented by such alarms. Accordingly, in some examples, such individuals and/or their associated roles are associated with the electrical equipment source type 308.

In the illustrated example of FIG. 3, the process hardware source type 310 corresponds to passive physical assets such as, for example, a reaction vessel, a reactor, or a heat exchanger. In the illustrated example, alarms arising from this source type (e.g., process hardware equipment) indicate failure, performance degradation, and/or other abnormal conditions of such equipment. In some examples, individuals with specialized expertise in inspection, periodic maintenance and/or parts replacement may be best qualified and/or specifically have a role to resolve the issues presented by such alarms. Accordingly, in some examples, such individuals and/or their associated roles are associated with the process hardware source type 310.

In the illustrated example of FIG. 3, the process conditions source type 312 corresponds to alarms that indicate failure, performance degradation, and/or other abnormal conditions that do not arise from either hardware or software in the process control system. That is, the process conditions source type 312 corresponds to alarms that do not correspond to any of the other source types 302, 304, 306, 308, 310. For example, an alarm indicating a disturbance caused by a change in raw material properties would fall within the process conditions source type 312. In some examples, individuals with specialized expertise in monitoring and/or managing process conditions and/or in understanding process dynamics may be best qualified and/or specifically have a role to resolve the issues presented by such alarms. Accordingly, in some examples, such individuals and/or their associated roles are associated with the process conditions source type 312. In some examples, primary alarm users (e.g., control operators and/or maintenance technicians) fulfill these roles with respect to process conditions and, therefore, may be assigned such alarms along with other more specialized secondary alarm users.

Returning to FIG. 2, in some examples, the alarm categorizer 206 assigns each alarm in a process control system to a corresponding source type 302, 304, 306, 308, 310, 312 based on the definitions of the different source types in the data structure 300 of FIG. 3 as described above. In this manner, the alarm categorizer 206 may identify subsets of the process control alarms corresponding to each of the source types 302, 304, 306, 308, 310, 312. In some examples, the identification of the subsets of alarms associated with each source type is stored in the source type database 208.

Figure 4:
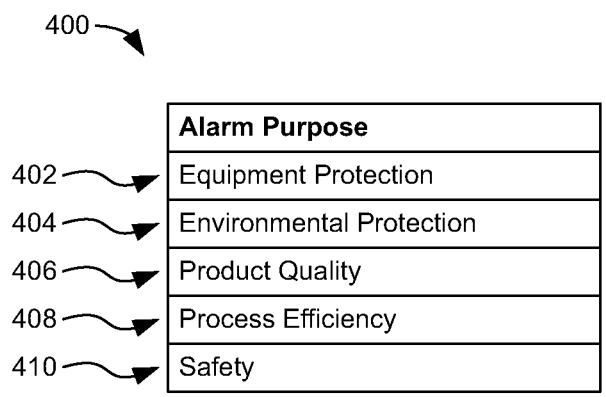
FIG. 4 illustrates an example alarm purpose data structure associated with the example alarm purpose database of FIG. 2.

Similar to the different source types described above, in some examples, the different alarm purposes used to categorize the alarms are designated in a data structure stored in the alarm purpose database 210. An example alarm purpose data structure 400 is illustrated in FIG. 4. As shown in FIG. 4, the example alarm purpose data structure 400 includes five different functional classes or alarm purposes 402, 404, 406, 408, 410. In the illustrated example, the alarm purposes 402, 404, 406, 408, 410 are mutually exclusive and collectively exhaustive. That is, in the illustrated example, each alarm in the process control system 100 is assigned to only one of the alarm purposes but every alarm in the process control system is assigned to one of the alarm purposes.

As used herein, the purpose of an alarm refers to the reason or type of benefit to be achieved by responding to the alarm. Put another way, an alarm purpose corresponds to the type of general outcome achieved by avoiding the consequence associated with the triggering of the alarm. In some examples, the purpose of an alarm serves to group alarms according to reasons for alarms for which individuals with particular roles and associated duties and/or specialized expertise may have an interest and/or are qualified to address and/or resolve. For example, the equipment protection alarm purpose 402 corresponds to alarms that serve to protect physical assets in the process control system. That is, such alarms alert a user to abnormal conditions that if left unaddressed will lead to damage, degradation, and/or destruction to physical assets such as, for example, a pump, a heat exchanger or a vessel. In some examples, individuals with specialized expertise and/or having specific roles to address such alarms are associated with the equipment protection alarm purpose 402.

In the illustrated example of FIG. 4, the environmental protection alarm purpose 404 corresponds to alarms that serve to protect against damage to the environment and/or ensure compliance with environmental protection regulations. That is, such alarms alert a user to abnormal conditions that if left unaddressed will lead to environmental harm and/or require remedial action. In some examples, individuals with specialized expertise and/or having specific roles to address such alarms are associated with the environmental protection alarm purpose 404.

In the illustrated example of FIG. 4, the product quality alarm purpose 406 corresponds to alarms that serve to ensure the quality of product(s) of the process control system. That is, such alarms alert a user to abnormal conditions that if left unaddressed will adversely affect the quality of the product(s) being manufactured or otherwise processed. In some examples, individuals with specialized expertise and/or having specific roles to address such alarms are associated with the product quality alarm purpose 406.

In the illustrated example of FIG. 4, the process efficiency alarm purpose 408 corresponds to alarms that serve to improve (e.g., optimize) the efficiency of the process control system. That is, such alarms alert a user to abnormal conditions that if left unaddressed will result in production inefficiencies such as longer processing time, increased energy consumption and/or reduced yield. In some examples, individuals with specialized expertise and/or having specific roles to address such alarms are associated with the process efficiency alarm purpose 408.

In the illustrated example of FIG. 4, the safety alarm purpose 410 corresponds to alarms that serve to ensure the health and safety of individuals present in the process control system environment. That is, such alarms alert a user to abnormal conditions that if left unaddressed can result in human injury or fatality. In some examples, individuals with specialized expertise and/or having specific roles to address such alarms are associated with the safety alarm purpose 410.

Returning to FIG. 2, in some examples, the alarm categorizer 206 assigns each alarm in a process control system to a corresponding alarm purpose 402, 404, 406, 408, 410 based on the definitions of the different source types in the data structure 400 of FIG. 4 as described above. In this manner, the alarm categorizer may identify subsets of the process control alarms corresponding to each of the alarm purposes 402, 404, 406, 408, 410. In some examples, the identification of the subsets of alarms associated with each alarm purpose is stored in the alarm purpose database 210.

In the illustrated example of FIG. 2, the operator station 104 is provided with the example user role identifier 212 to identify the role of a user of the operator station 104. In some examples, the user role identifier 212 identifies a user based on a user ID (e.g., entered during a user login). In some examples, the user role identifier 212 identifies a user based on other user input such as the user self-identifying a particular role. In some examples, the user role may be selected by a user from a list of potential user roles. In some such examples, the list of roles is stored in a data structure in the user role database 214. An example user role data structure 500 is illustrated in FIG. 5.

As shown in the illustrated example of FIG. 5, the user role data structure 500 includes a list of user roles 502 in a first column corresponding to typical roles in many process control systems. In some examples, the list of user roles 502 is generated by a vendor and/or manufacturer. In some examples, the list of user roles 502 is generated by an end user. In some examples, the list of user roles 502 may include custom positions added by an end user in addition to standard roles preconfigured by a vendor and/or manufacturer.

In addition to the list of user roles 502, the example user role data structure 500 may include associated source type(s) 504 for each of the user roles 502. As shown in the illustrated example, the associated source type(s) 504 correspond to the source types 302, 304, 306, 308, 310, 312 in the data structure 300 of FIG. 3. Thus, in some examples, the user role data structure 500 serves to link specific roles of individuals with particular source types associated with those roles. As a result, the alarms assigned to each alarm source type (e.g., as stored in the source type database 208) can likewise be associated with the corresponding user roles. Additionally or alternatively, the example user role data structure 500 may include associated alarm purpose(s) 506 for each of the user roles 502. As shown in the illustrated example, the associated alarm purpose(s) 506 correspond to the alarm purposes 402, 404, 406, 408, 410 in the data structure 400 of FIG. 4. Thus, in some examples, the user role data structure 500 serves to link specific roles of individuals with particular alarm purposes associated with those roles. As a result, the alarms assigned to each alarm purpose (e.g., as stored in the alarm purpose database 210) can likewise be associated with the corresponding user roles.

In some examples, the user role data structure 500 may include user roles 502 corresponding to primary alarm users (e.g., control room operators 508, 510). In the illustrated example, the control room operators 508, 510 are associated with alarms arising from the process conditions source type, which are typically the main alarms addressed by such individuals. However, in some examples, other source types of alarms may also be designated for primary alarm users. Furthermore, other source types and/or alarm purposes may be associated with any of the user roles 502 shown in the user role data structure 500. In some examples, a particular user role may be associated with both a particular source type and a particular alarm purpose.

As shown in the illustrated example of FIG. 5, some user roles (e.g., the production manager 512) are associated with more than one alarm purpose. Likewise, in some examples, a user role (e.g., the online machinery engineer 514) is associated with more than one source type. In some examples, a user role is associated with both particular source type(s) and particular alarm purpose(s). In some examples, the assignment of the source type(s) and the alarm purpose(s) to the different user roles is preconfigured by a vendor and/or manufacturer. In some such examples, the vendor and/or manufacturer provides default assignments that may be altered and/or customized by end users for their particular purposes. Further, in some examples, the end user may designate the source type(s) and/or the alarm purpose(s) to which each user role in the list of user roles 502 is to be associated. In some examples, end users may define custom user roles and the corresponding source type(s) and/or alarm purpose(s). In some such examples, a custom user role may correspond to a particular individual with associated particular preferences regardless of the specific duties or responsibilities of the individual. In such examples, the custom position may supersede the designated source type(s) and/or alarm purpose(s) for the generic role of the individual. For example, as shown in FIG. 5, the user role of safety engineer 516 is associated with the safety alarm purpose. However, a specific safety engineer may configure a custom position that associates the safety engineer with alarms having an environmental protection purpose as well as the safety purpose. In such examples, even though the official or general role of the individual is safety engineer, the custom position will supersede the generic user role in the data structure 500 so that the individual may receive the alarm information desired based on the individuals preferences.

Figure 6:
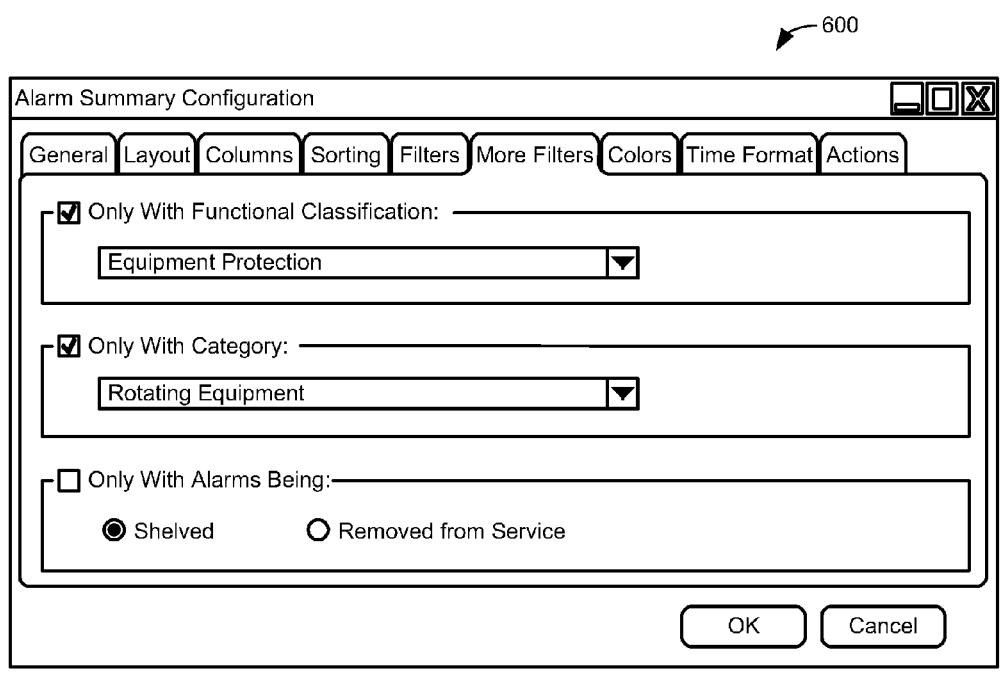
FIG. 6 illustrates an example alarm configuration dialogue to configure an alarm display generated by the example alarm presentation application of FIG. 2.

Returning to FIG. 2, the example operator station 104 is provided with the example alarm filter 216 to filter process control alarms based on the source type and/or alarm purpose of the alarms. In some examples, the alarm filter 216 identifies the alarms to be filtered based on the role of the user as identified by the user role identifier 212. That is, by identifying the role of the user, the alarm filter 216 determines the associated alarm purpose(s) and/or source type(s) as designated in the user role data structure 500. In some examples, the alarm filter 216 identifies the alarms to be filtered based on a user input independent of the role of the user. For example, a user may manually select one or more particular source types and/or alarm purposes for which alarm information is to be displayed and/or filtered. In some examples, the user selection is made through an alarm configuration dialogue 600 as shown in FIG. 6. In some such examples, the alarm purpose (functional classification) and source type (category) selected from the configuration dialogue 600 may be saved in the user role database 214 (e.g., as a new custom position or user role). Once the alarm filter 216 filters the process control alarms, the alarm presentation interface may render an alarm display that excludes alarm information corresponding to alarms that have been filtered out. An example alarm display is described below in connection with FIG. 7.

While an example manner of implementing the operator station 104 of FIG. 1 is illustrated in FIG. 2, one or more of the elements, processes and/or devices illustrated in FIG. 2 may be combined, divided, re-arranged, omitted, eliminated and/or implemented in any other way. Further, the example memory 202, the example alarm presentation application 204, the example alarm categorizer 206, the example source type database 208, the example alarm purpose database 210, the example user role identifier 212, the example user role database 214, the example alarm filter 216, the example communication interface 218 and/or, more generally, the example operator station 104 of FIG. 2 may be implemented by hardware, software, firmware and/or any combination of hardware, software and/or firmware. Thus, for example, any of the example memory 202, the example alarm presentation application 204, the example alarm categorizer 206, the example source type database 208, the example alarm purpose database 210, the example user role identifier 212, the example user role database 214, the example alarm filter 216, the example communication interface 218 and/or, more generally, the example operator station 104 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example memory 202, the example alarm presentation application 204, the example alarm categorizer 206, the example source type database 208, the example alarm purpose database 210, the example user role identifier 212, the example user role database 214, the example alarm filter 216, and/or the example communication interface 218 is/are hereby expressly defined to include a tangible computer readable storage device or storage disk such as a memory, a digital versatile disk (DVD), a compact disk (CD), a Blu-ray disk, etc. storing the software and/or firmware. Further still, the example operator station 104 of FIG. 1 may include one or more elements, processes and/or devices in addition to, or instead of, those illustrated in FIG. 2, and/or may include more than one of any or all of the illustrated elements, processes and devices.

Figure 7:
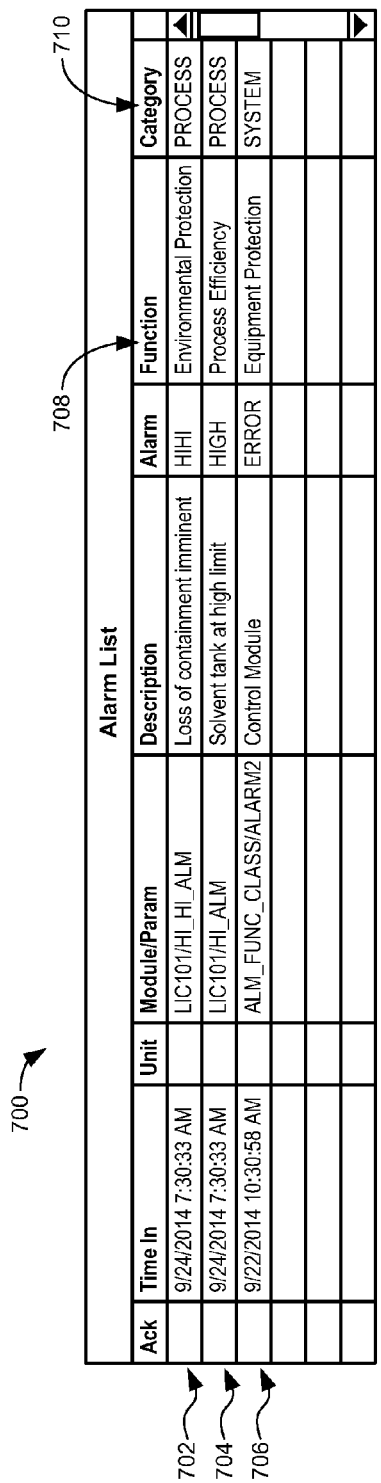
FIG. 7 illustrates an example alarm display generated by the example alarm presentation application of FIG. 2.

FIG. 7 illustrates an example alarm display 700 that may be rendered to display alarm information that may be filtered based on at least one of source type or alarm purpose. In the illustrated example of FIG. 7, the alarm display 700 is an alarm list similar to many known alarm lists. In the illustrated example, the alarm list 700 represents alarm information in a tabular format where each line 702, 704, 706 corresponds to a particular alarm. Unlike known alarm lists, the example alarm list 700 includes a functional classification column 708 and a category column 710.

In the illustrated example, the functional classification column 708 is provided to indicate the purpose of each alarm. As shown in the illustrated example of FIG. 7, the alarm on the first line 702 is associated with the environmental protection alarm purpose indicating that the consequence of not addressing the corresponding alarm includes a potential environmental hazard. The alarm on the second line 704 is associated with the process efficiency alarm purpose indicating that the consequence of not addressing the corresponding alarm may result in a less efficient operating level. The alarm on the third line 706 is associated with the equipment protection alarm purpose indicating that degradation and/or damage to the associated equipment could result if the corresponding alarm is not addressed. In the illustrated example, if the alarms shown in the alarm display 700 were filtered according to the process efficiency alarm purpose, only the alarm on the second line 704 would be displayed while the other alarms would be excluded or removed from display. By contrast, if the alarms are filtered according to the equipment protection alarm purpose, only the alarm on the third line 706 would be displayed while the other alarms would be excluded or removed from display. Similarly, in some examples, if the alarms are filtered according to the safety alarm purpose, all of the displayed alarms would be removed from the alarm display because none of them are assigned to the safety alarm purpose. In this manner, particular subsets of the alarms can be quickly identified to assist users in assessing the alarms associated with a particular objective or purpose (e.g., equipment protection, environmental protection, product quality, process efficiency, and/or safety). In some examples, where the user has an identified role associated with such purposes, the alarm display 700 is automatically filtered corresponding to the alarm purpose(s) associated with the role of the user (e.g., as defined in the user role data structure 500).

In the illustrated example, the category column 710 is provided to indicate the type of source of each alarm (e.g., the general category of assets or other circumstances from which each alarm arises). As shown in the illustrated example of FIG. 7, the alarms on the first and second lines 702, 704 are associated with the process condition source type and, thus, indicate potential problems with process dynamics not attributable to hardware or software in the process control system. Alarms arising from process conditions are the sort of alarms typically addressed by a control system operator. The alarm on the third line 706 is associated with the control system source type and, thus, indicates there is a problem associated with the control system hardware and/or software (for which a control system engineer with the proper skill set may be needed to resolve).

In the illustrated example, if the alarms shown in the alarm display 700 were filtered according to the process conditions source type, the alarms on the first and second lines 702, 704 would be displayed while the other alarm (on the third line 706) would be excluded or removed from display. By contrast, if the alarms are filtered according to the control system source type, only the alarm on the third line 706 would be displayed while the other alarms would be excluded or removed from display. In this manner, particular subsets of the alarms can be quickly identified to assist users in assessing the alarms associated with a particular type of source (e.g., instrumentation equipment, control system equipment, rotating equipment, electrical equipment, process hardware, and/or process conditions). In some examples, where the user has an identified role associated with source types, the alarm display 700 is automatically filtered corresponding to the source type(s) associated with the role of the user (e.g., as defined in the user role data structure 500).

As shown in the illustrated example, the alarms on the first and second lines 702, 704 correspond to the identical process variable (e.g., tag LIC101). However, the distinction between the alarms is the alarm type; the alarm on the first line 702 is a high-high alarm, whereas the alarm on the second line 704 is only a high alarm. As noted above, the high alarm (on the second line 704) is assigned to the process efficiency alarm purpose, while the high-high alarm (on the first line 702) is assigned to the environmental protection alarm purpose. Thus, in some examples, a single process measurement may be associated with different alarm purposes depending upon the nature of the alarm triggered by the value of the process measurement. By contrast, because both of the alarms represented on the first and second lines 702, 704 correspond to the same process variable, they necessarily arise from the same source which, in the illustrated example, corresponds to the process conditions alarm source.

Figure 8:
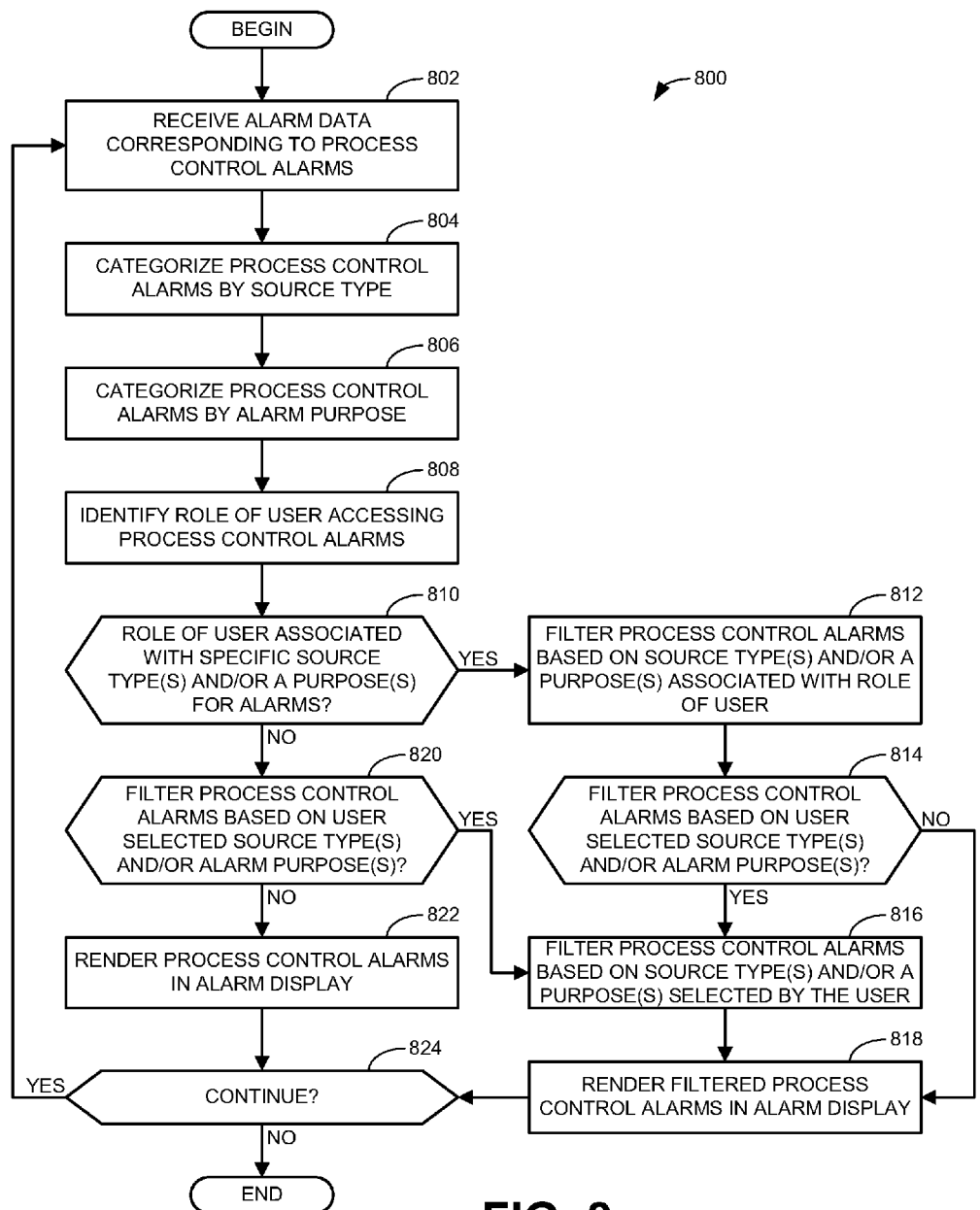
FIG. 8 is a flowchart representative of an example process for implementing the example operator station of FIGS. 1 and/or 2

A flowchart 800 representative of an example method for implementing the operator station 104 of FIGS. 1 and/or 2 is shown in FIG. 8. In some examples, the method may be implemented using machine readable instructions that comprise a program for execution by a processor such as the processor 912 shown in the example processor platform 900 discussed below in connection with FIG. 9. The program may be embodied in software stored on a tangible computer readable storage medium such as a CD-ROM, a floppy disk, a hard drive, a digital versatile disk (DVD), a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowchart illustrated in FIG. 7, many other methods of implementing the example operator station 104 may alternatively be used. For example, the order of execution of the blocks may be changed, and/or some of the blocks described may be changed, eliminated, or combined.

As mentioned above, the example method of FIG. 8 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example method of FIG. 8 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The example method of FIG. 8 begins at block 802 where the example communication interface 218 receives alarm data corresponding to process control alarms. At block 804, the example alarm categorizer 206 categorizes the process control alarms by source type. In some examples, the alarm categorizer 206 categorizes the process control alarms by assigning each alarm to a particular source type (e.g., designated in the source type data structure 300). In some examples, the alarms categorized by source type are stored in the source type database 208. At block 806, the example alarm categorizer 206 categorizes the process control alarms by alarm purpose. In some examples, the alarm categorizer 206 categorizes the process control alarms by assigning each alarm to a particular alarm purpose (e.g., designated in the alarm purpose data structure 400). In some examples, the alarms categorized by alarm purpose are stored in the alarm purpose database 210. At block 808, the user role identifier 212 identifies the role of the user accessing the process control alarms.

At block 810, the example user role identifier 212 determines whether the role of the user is associated with specific source type(s) and/or purpose(s) for alarms. If so, control advances to block 812 where the example alarm filter 216 filters the process control alarms based on the source type(s) and/or purpose(s) associated with the role of the user. For example, if the role of the user is instrumentation technician, the user role identifier 212 may determine that the user is associated with alarms corresponding to the instrumentation equipment source type (e.g., as indicated in the user role data structure 500 of FIG. 5). In such examples, the alarm filter 216 filters the process control alarms according to the instrumentation equipment source type. That is, all alarms that do not arise from instrumentation equipment are removed from the process control alarms.

In some examples, a user may desire to further narrow or filter process control alarms for presentation via an alarm display beyond the source type(s) and/or alarm purpose(s) associated with the role of the user. Accordingly, at block 814, the example alarm filter 216 determines whether to filter the process control alarms based on user selected source type(s) and/or alarm purpose(s). If so, control advances to block 816, where the example alarm filter 216 filters the process control alarms based on the source type(s) and/or alarm purpose(s) selected by the user. Control then advances to block 818, where the example alarm presentation application 204 renders the filtered process control alarms in an alarm display (e.g., the alarm list 700 of FIG. 7). If the example alarm filter 216 determines not to filter the process control alarms based on user selected source type(s) and/or alarm purpose(s) (block 814) (e.g., the user has not made such a selection), control advances directly to block 818. After rendering the filtered process control alarms (block 818), control advances to block 824 where the example alarm presentation application 204 determines whether to continue. If so, control returns to block 802. Otherwise, the example method of FIG. 8 ends.

Returning to block 810, if the example user role identifier 212 does not determine that the role of the user is associated with specific source type(s) and/or purpose(s) for alarms, control advances to 820. In some examples, the user role identifier 212 may not identify the role of the user as associated with specific source type(s) and/or purpose(s) for alarms because the role of the user is not identified and/or specified. In some examples, the user role identifier 212 may not identify the role of the user as associated with specific source type(s) and/or purpose(s) for alarms because the particular role of the user, though identified, is not associated with any particular source type and/or alarm purpose (e.g., a control room operator that receives all alarms). At block 820, the example alarm filter 216 determines whether to filter the process control alarms based on user selected source type(s) and/or alarm purpose(s). If so, control advances to block 816, where the example alarm filter 216 filters the process control alarms as described above. If the example alarm filter 216 determines not to filter the process control alarms based on user selected source type(s) and/or alarm purpose(s) (block 820), control advances to block 822 where the example alarm presentation application 204 renders the process control alarms (e.g., without filtering) in an alarm display (e.g., the alarm list 700 of FIG. 7). Control then advances to block 824 where it is determined whether the example method of FIG. 8 is to continue or end.

Figure 9:
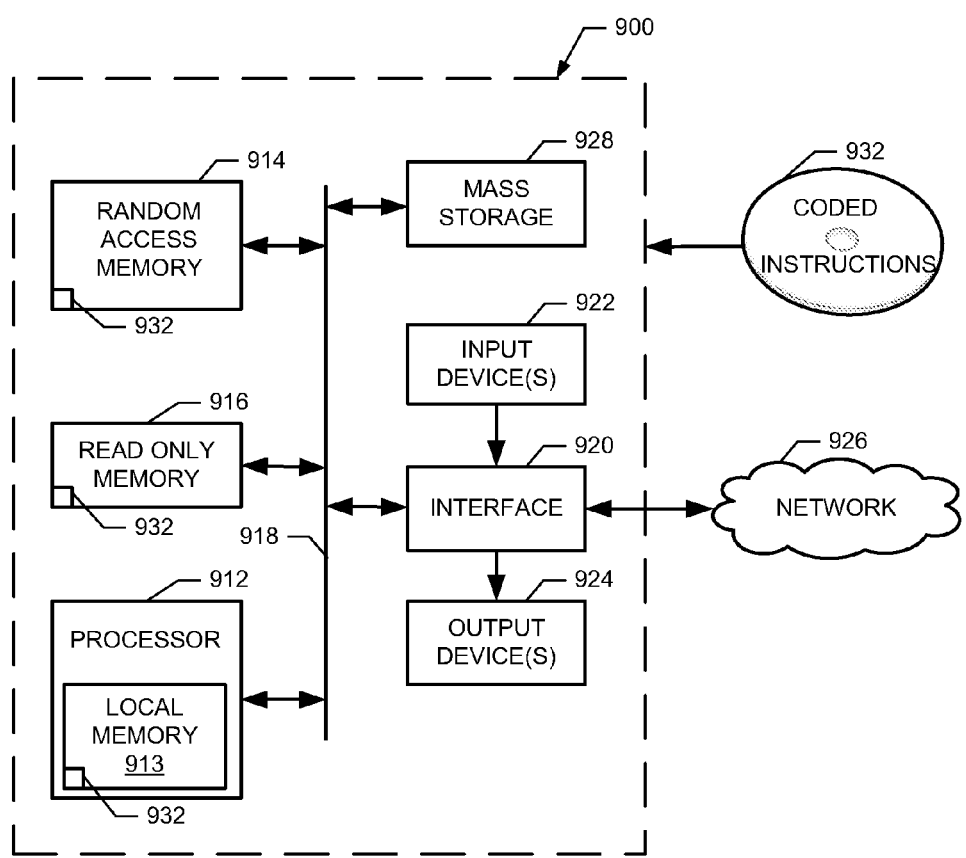
FIG. 9 is a schematic diagram of an example processor platform that may be used and/or programmed to carry out the example process of FIG. 8 and/or, more generally, to implement the example operator station of FIGS. 1 and/or 2.

FIG. 9 is a block diagram of an example processor platform 900 capable of executing instructions to perform the method of FIG. 8 to implement the operator station 104 of FIGS. 1 and/or 2. The processor platform 900 can be, for example, a server, a personal computer, a mobile device (e.g., a cell phone, a smart phone, a tablet such as an iPad™), a personal digital assistant (PDA), an Internet appliance, or any other type of computing device.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a PCI express interface.

In the illustrated example, one or more input devices 922 are connected to the interface circuit 920. The input device(s) 922 permit(s) a user to enter data and commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 920 of the illustrated example, thus, typically includes a graphics driver card, a graphics driver chip or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID systems, and digital versatile disk (DVD) drives.

Coded instructions 932 to implement the method of FIG. 8 may be stored in the mass storage device 928, in the volatile memory 914, in the non-volatile memory 916, and/or on a removable tangible computer readable storage medium such as a CD or DVD.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method comprising:
   receiving process control alarm network communications from network connected devices in a process control system, the process control alarm network communications including process control alarms;
   assigning, with a processor, a first subset of the process control alarms in the process control system to a first source type of the process control alarms, the first source type associated with a first subset of user roles;
   assigning, with the processor, a second subset of the process control alarms to a second source type of the process control alarms, the second source type associated with a second subset of the user roles, the first subset of the process control alarms different than the second subset of the process control alarms, the first subset of the user roles different than the second subset of the user roles;
   assigning, with the processor, a third subset of the process control alarms to a first alarm purpose, the first alarm purpose associated with a third subset of the user roles and exclusive to the third subset of the process control alarms; and
   sending an alarm information network communication associated with the process control alarms to a network connected device associated with the user roles, the alarm information network communication including alarm information to be displayed identifying the first source type of the first subset of the process control alarms and the second source type of the second subset of the process control alarms.

2. The method of claim 1, wherein the first and the second source types correspond to a different one of at least one of a category of assets or a circumstance from which the corresponding first or second subset of the process control alarms arise.

3. The method of claim 1, wherein each of the first and the second source types corresponds to a different one of instrumentation equipment, control system equipment, rotating equipment, electrical equipment, process hardware, or process conditions in the process control system.

4. The method of claim 1, further comprising:
   assigning a fourth subset of the process control alarms to a second alarm purpose different than the first alarm purpose, the second alarm purpose associated with a fourth subset of the user roles, the alarm information identifying the first alarm purpose of the third subset of the process control alarms and the second alarm purpose of the fourth subset of the process control alarms.

5. The method of claim 4, wherein the first and the second alarm purposes correspond to a type of benefit to be achieved by a user responding to the corresponding first or second subset of the process control alarms.

6. The method of claim 4, wherein each of the first and the second alarm purposes corresponds to a different one of equipment protection, environment protection, product quality, process efficiency, or safety.

7. The method of claim 4, further comprising:
   filtering the process control alarms according to the first alarm purpose; and
   updating the alarm information to be displayed to exclude the fourth subset of the process control alarms in response to the filtering.

8. The method of claim 7, further comprising:
identifying a role of a user accessing the alarm information; and
filtering the process control alarms based on the role of the user, the role of the user corresponding to the third subset of the user roles.

9. The method of claim 1, further comprising:
filtering the process control alarms according to the first source type; and
updating the alarm information to be displayed to display the first subset of the process control alarm while excluding the second subset of the process control alarms in response to the filtering.

10. The method of claim 9, further comprising:
identifying a role of a user accessing the alarm information; and
filtering the process control alarms according to the first source type based on the role of the user, the role of the user corresponding to the first subset of the user roles.

11. An apparatus comprising:
an alarm categorizer to:
receive process control alarm network communications from network connected devices in a process control system, the process control alarm network communications including process control alarms;
assign a first subset of the process control alarms in the process control system to a first source type of the process control alarms, the first source type associated with a first subset of user roles,
assign a second subset of the process control alarms to a second source type of the process control alarms, the second source type associated with a second subset of the user roles, the first subset of the process control alarms different than the second subset of the process control alarms, the first subset of the user roles different than the second subset of the user roles,
assign a third subset of the process control alarms to a first alarm purpose, the first alarm purpose associated with a third subset of the user roles and exclusive to the third subset of the process control alarms, and
send an alarm information network communication associated with the process control alarms to a network connected device associated with the user roles, the alarm information network communication including alarm information to be displayed identifying the first source type of the first subset of the process control alarms and the second source type of the second subset of the process control alarms.

12. The apparatus of claim 11, wherein each of the first and the second source types corresponds to a different one of instrumentation equipment, control system equipment, rotating equipment, electrical equipment, process hardware, or process conditions in the process control system.

13. The apparatus of claim 11, wherein the alarm categorizer is to:
assign a fourth subset of the process control alarms to a second alarm purpose different than the first alarm purpose, the second alarm purpose associated with a fourth subset of the user roles, the alarm information identifying the first alarm purpose of the third subset of the process control alarms and the second alarm purpose of the fourth subset of the process control alarms.

14. The apparatus of claim 13, further comprising:
an alarm filter to filter the process control alarms according to the first alarm purpose; and
an alarm presentation application to update the alarm information to be displayed, the alarm information to exclude the fourth subset of the process control alarms in response to the filtering.

15. The apparatus of claim 14, further comprising a role identifier to identify a role of a user accessing the alarm information, the alarm filter to filter the process control alarms based on the role of the user, the role of the user corresponding to the third subset of the user roles.

16. The apparatus of claim 11, further comprising:
an alarm filter to filter the process control alarms according to the first source type; and
an alarm presentation application to update the alarm information to be displayed to the first subset of the process control alarm while excluding the second subset of the process control alarms in response to the filtering.

17. The apparatus of claim 16, further comprising a role identifier to identify a role of a user accessing the alarm information, the alarm filter to filter the process control alarms according to the first source type based on the role of the user, the role of the user corresponding to the first subset of the user roles.

18. A tangible computer readable storage medium comprising instructions that, when executed, cause a machine to at least:
receive process control alarm network communications from network connected devices in a process control system, the process control alarm network communications including process control alarms;
assign a first subset of the process control alarms in the process control system to a first source type of the process control alarms, the first source type associated with a first subset of user roles;
assign a second subset of the process control alarms to a second source type of the process control alarms, the second source type associated with a second subset of the user roles, the first subset of the process control alarms different than the second subset of the process control alarms, the first subset of the user roles different than the second subset of the user roles;
assign a third subset of the process control alarms to a first alarm purpose, the first alarm purpose associated with a third subset of the user roles and exclusive to the third subset of the process control alarms; and
send an alarm information network communication associated with the process control alarms to a network connected device associated with the user roles, the alarm information network communication including alarm information to be displayed identifying the first source type of the first subset of the process control alarms and the second source type of the second subset of the process control alarms.

19. The storage medium of claim 18, wherein the instructions further cause the machine to:
assign a fourth subset of the process control alarms to a second alarm purpose different than the first alarm purpose, the second alarm purpose associated with a fourth subset of the user roles, the alarm information identifying the first alarm purpose of the third subset of the process control alarms and the second alarm purpose of the fourth subset of the process control alarms.

20. The storage medium of claim 18, wherein the instructions further cause the machine to:
filter the process control alarms according to the first source type; and update the alarm information to be displayed to the first subset of the process control alarm while excluding the second subset of the process control alarms in response to the filtering.

* * * * *